(12) United States Patent
Bhatia et al.

(10) Patent No.: US 10,896,125 B2
(45) Date of Patent: Jan. 19, 2021

(54) GARBAGE COLLECTION METHODS AND MEMORY SYSTEMS FOR HYBRID ADDRESS MAPPING

(71) Applicant: SK hynix Inc., Gyeonggi-do (KR)

(72) Inventors: Aman Bhatia, San Jose, CA (US); Naveen Kumar, San Jose, CA (US); Yu Cai, San Jose, CA (US); Fan Zhang, Fremont, CA (US)

(73) Assignee: SK hynix Inc., Gyeonggi-do (KR)

( * ) Notice: Subject to any disclaimer, the term of this patent is extended or adjusted under 35 U.S.C. 154(b) by 21 days.

(21) Appl. No.: 16/194,144

(22) Filed: Nov. 16, 2018

(65) Prior Publication Data

US 2019/0155726 A1 May 23, 2019

Related U.S. Application Data

(60) Provisional application No. 62/588,091, filed on Nov. 17, 2017, provisional application No. 62/588,102, filed on Nov. 17, 2017.

(51) Int. Cl.
*G06F 12/02* (2006.01)
*G06F 12/10* (2016.01)
*G06F 12/0804* (2016.01)

(52) U.S. Cl.
CPC ...... *G06F 12/0253* (2013.01); *G06F 12/0246* (2013.01); *G06F 12/0804* (2013.01); *G06F 12/10* (2013.01); *G06F 2212/1016* (2013.01); *G06F 2212/1044* (2013.01); *G06F 2212/1048* (2013.01); *G06F 2212/608* (2013.01); *G06F 2212/7201* (2013.01); *G06F 2212/7202* (2013.01); *G06F 2212/7203* (2013.01); *G06F 2212/7205* (2013.01)

(58) Field of Classification Search
None
See application file for complete search history.

(56) References Cited

U.S. PATENT DOCUMENTS

| 8,261,010 | B2 | 9/2012 | Eom et al. |
| RE45,577 | E | 6/2015 | Kim et al. |
| 2008/0098195 | A1* | 4/2008 | Cheon ............ G06F 12/0246 711/202 |
| 2012/0066438 | A1* | 3/2012 | Yoon ............... G06F 12/0246 711/103 |
| 2014/0122774 | A1 | 5/2014 | Xian et al. |

(Continued)

FOREIGN PATENT DOCUMENTS

KR 101247388 3/2013

OTHER PUBLICATIONS

Kim, J. et al., A Space-Efficient Flash Translation Layer for Compactflash Systems, May 2002, pp. 366-375, vol. 48, No. 2, IEEE Transactions on Consumer Electronics.

(Continued)

*Primary Examiner* — Denise Tran
(74) *Attorney, Agent, or Firm* — IP & T Group LLP

(57) ABSTRACT

Methods and systems are provided for performing a garbage collection scheme for hybrid address mapping. A controller of a memory system receives data and a logical address for the data from a host device, writes the data in a page of an open log block and performs a garbage collection on a log block and under a certain condition, one or more data blocks, when the open log block is full.

20 Claims, 11 Drawing Sheets

(56) References Cited

U.S. PATENT DOCUMENTS

2016/0371291 A1    12/2016   Shamis et al.
2017/0242789 A1*    8/2017   Ahmed ............... G06F 12/0246
2018/0165022 A1*    6/2018   Tomic ................ G06F 12/0246
2018/0307620 A1    10/2018   Zhou
2019/0138612 A1    5/2019   Jeon et al.
2020/0042394 A1    2/2020   Resnik et al.

OTHER PUBLICATIONS

Celis, P., Robin Hood Hashing, 1986, Data Structuring Group Department of Computer Science, University of Waterloo, pp. 1-68.

Kim. J. et al., A space-efficient flash translation layer for CompactFlash systems, May 2002, pp. 366-375, vol. 48.2, IEEE Transactions on Consumer Electronics.

Knuth, D., Notes on "Open" Addressing, Jul. 22, 1963, pp. 1-8.

* cited by examiner

| INDEX | ELEMENT |
|---|---|
| 000 | KEY, VALUE OF ENTRY |
| 001 | |
| 002 | |
| ⋮ | |
| 151 | |
| 152 | |
| 153 | |
| ⋮ | |
| 253 | |
| 254 | |
| 255 | |

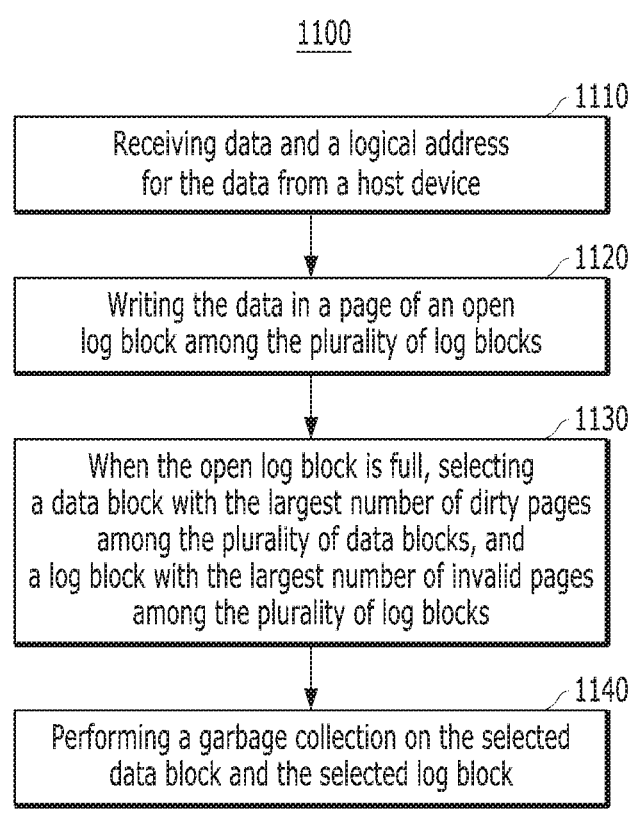

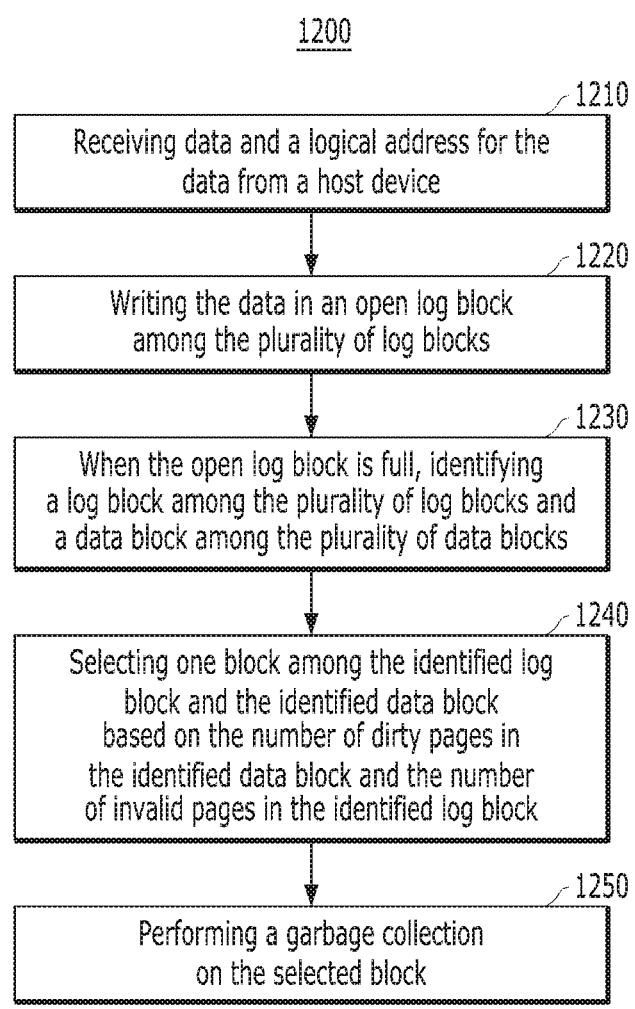

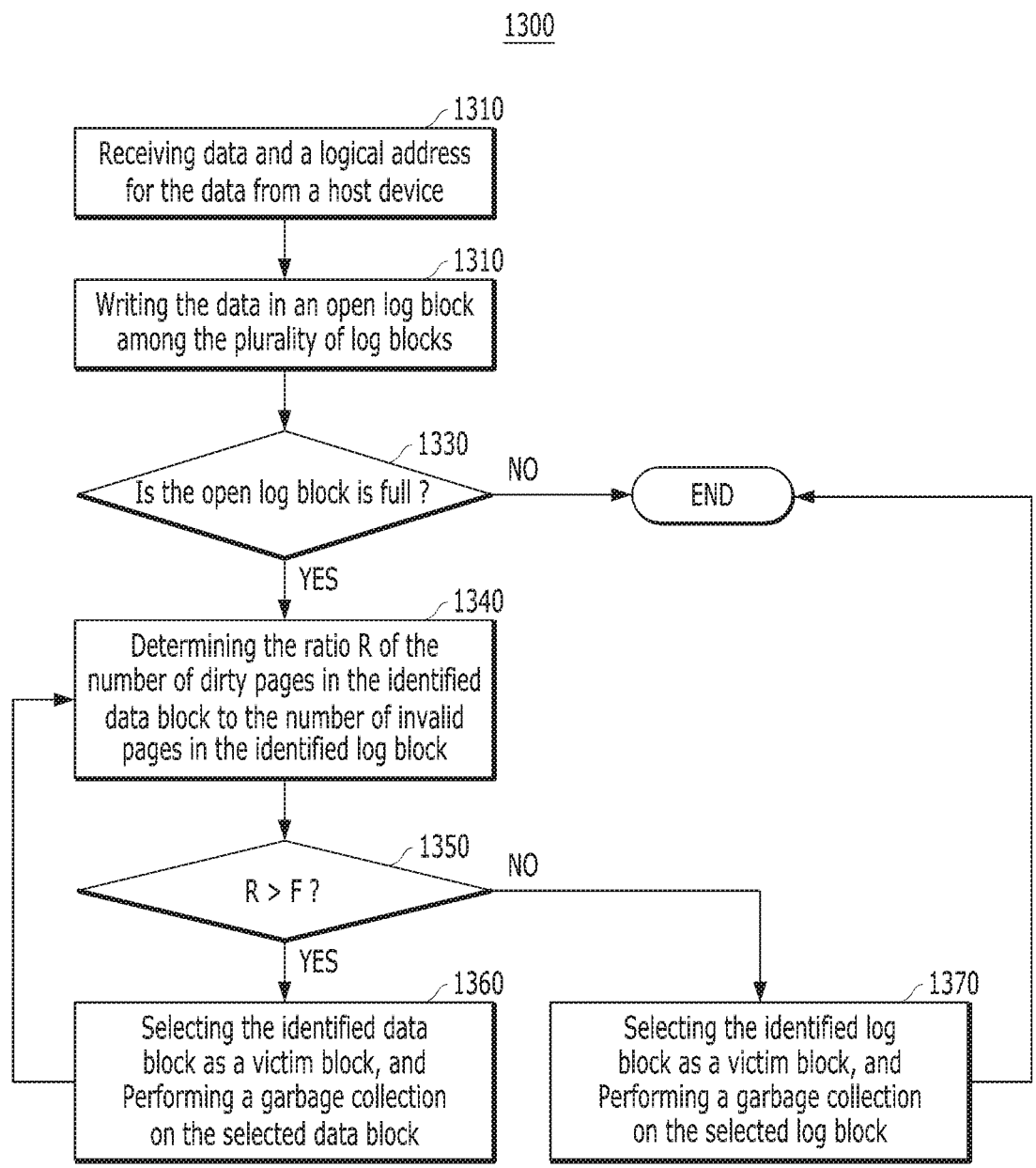

GARBAGE COLLECTION METHODS AND MEMORY SYSTEMS FOR HYBRID ADDRESS MAPPING

CROSS-REFERENCE TO RELATED APPLICATIONS

This application claims the benefit of U.S. Provisional Application Nos. 62/588,091 and 62/588,102, filed Nov. 17, 2017, the entire contents of which are incorporated herein by reference.

BACKGROUND

1. Field

Embodiments of the present disclosure relate to garbage collection schemes for address mapping of memory systems.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD). Memory systems use various address mapping schemes with memory requirements.

SUMMARY

Aspects of the present invention include methods and systems for performing a garbage collection scheme for a hybrid address mapping.

In one aspect, a method for operating a memory system including a memory device, which includes a plurality of physical blocks. The method includes: partitioning the plurality of physical blocks into a plurality of data blocks and a plurality of log blocks, each of the data blocks including a plurality of pages corresponding to logical addresses and each of the log blocks including multiple pages; receiving data and a logical address for the data from a host device; writing the data in a page of an open log block among the plurality of log blocks; when the open log block is full, selecting a data block with the largest number of dirty pages among the plurality of data blocks, and selecting a log block with the largest number of invalid pages among the plurality of log blocks; and performing a garbage collection on the selected data block and the selected log block.

In another aspect, a method for operating a memory system including a memory device, which includes a plurality of physical blocks. The method includes: partitioning the plurality of physical blocks into a plurality of data blocks and a plurality of log blocks, each of the data blocks and each of the log blocks including a plurality of pages; receiving data and a logical address for the data from a host device; writing the data in an open log block among the plurality of log blocks; when the open log block is full, identifying a log block among the plurality of log blocks and a data block among the plurality of data blocks; selecting one block among the identified log block and the identified data block based on the number of dirty pages in the identified data block and the number of invalid pages in the identified log block; and performing a garbage collection on the selected block.

In still another aspect, a memory system includes a memory device including a plurality of physical blocks, and a controller. The controller: partitions the plurality of physical blocks into a plurality of data blocks and a plurality of log blocks, each of the data blocks including a plurality of pages corresponding to logical addresses and each of the log blocks including multiple pages; receives data and a logical address for the data from a host device; writes the data in a page of an open log block among the plurality of log blocks; when the open log block is full, selects a data block with the largest number of dirty pages among the plurality of data blocks, and selects a log block with the largest number of invalid pages among the plurality of log blocks; and performs a garbage collection on the selected data block and the selected log block.

In yet another aspect, a memory system includes a memory device including a plurality of physical blocks, and a controller. The controller: partitions the plurality of physical blocks into a plurality of data blocks and a plurality of log blocks, each of the data blocks and each of the log blocks including a plurality of pages; receives data and a logical address for the data from a host device; writes the data in an open log block among the plurality of log blocks; when the open log block is full, identifies a log block among the plurality of log blocks, and a data block among the plurality of data blocks; selects one block among the identified log block and the identified data block based on the number of dirty pages in the identified data block and the number of invalid pages in the identified log block; and performs a garbage collection on the selected block.

Additional aspects of the present invention will become apparent from the following description.

BRIEF DESCRIPTION OF THE DRAWINGS

FIG. 8 is a diagram illustrating a page-level mapping table in accordance with an embodiment of the present invention.

FIG. 11 is a flow chart illustrating a garbage collection operation of a memory system in accordance with an embodiment of the present invention.

FIG. 12 is a flow chart illustrating a garbage collection operation of a memory system in accordance with an embodiment of the present invention.

FIG. 13 is a flow chart illustrating a garbage collection operation of a memory system in accordance with an embodiment of the present invention.

DETAILED DESCRIPTION

Figure 1:
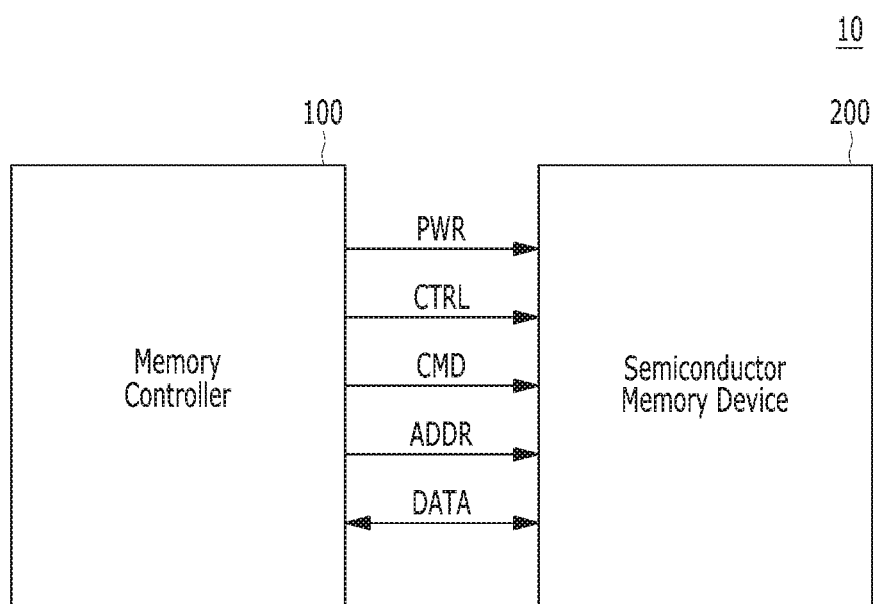
FIG. 1 is a block diagram illustrating a memory system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram illustrating a memory system 10 in accordance with an embodiment of the present invention.

Referring FIG. 1, the memory system 10 may include a memory controller 100 and a semiconductor memory device 200, which may represent more than one such device. The semiconductor memory device(s) 200 may be flash memory device(s), particularly of the NAND-type.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to form a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
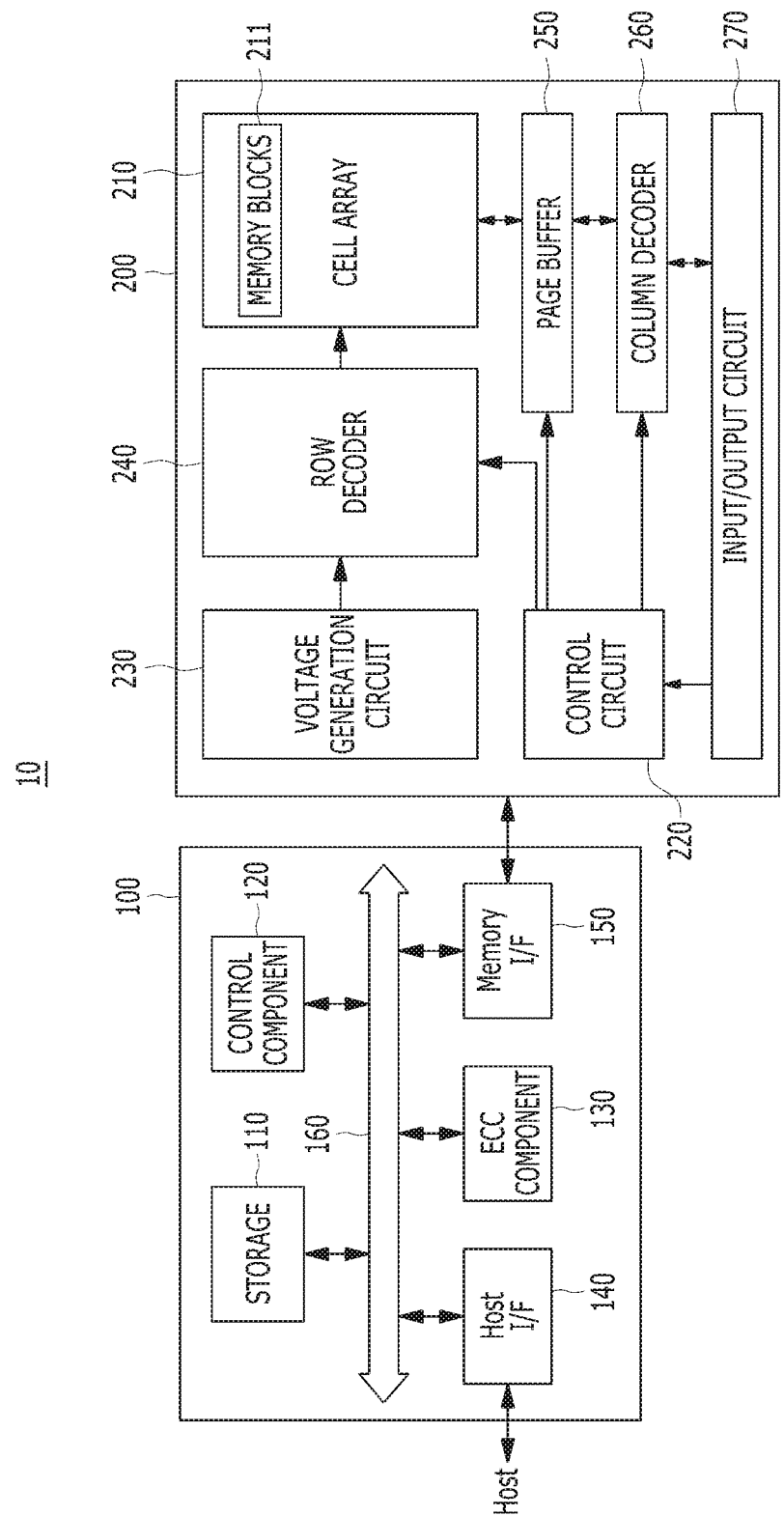
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device such as a mobile phone, a smart phone, an e-book, an MP3 player, a portable multimedia player (PMP), and/or a portable game player.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In some embodiments, the ECC component 130 may perform an error correction operation based on a coded modulation such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). As such, the ECC component 130 may include all circuits, systems or devices for suitable error correction operation.

The host interface 140 may communicate with the host device through one or more of various interface protocols such as a universal serial bus (USB), a multi-media card (MMC), a peripheral component interconnect express (PCI-e), a small computer system interface (SCSI), a serial-attached SCSI (SAS), a serial advanced technology attachment (SATA), a parallel advanced technology attachment (PATA), an enhanced smalldisk interface (ESDI), an integrated drive electronics (IDE), and non-volatile memory express (NVMe).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
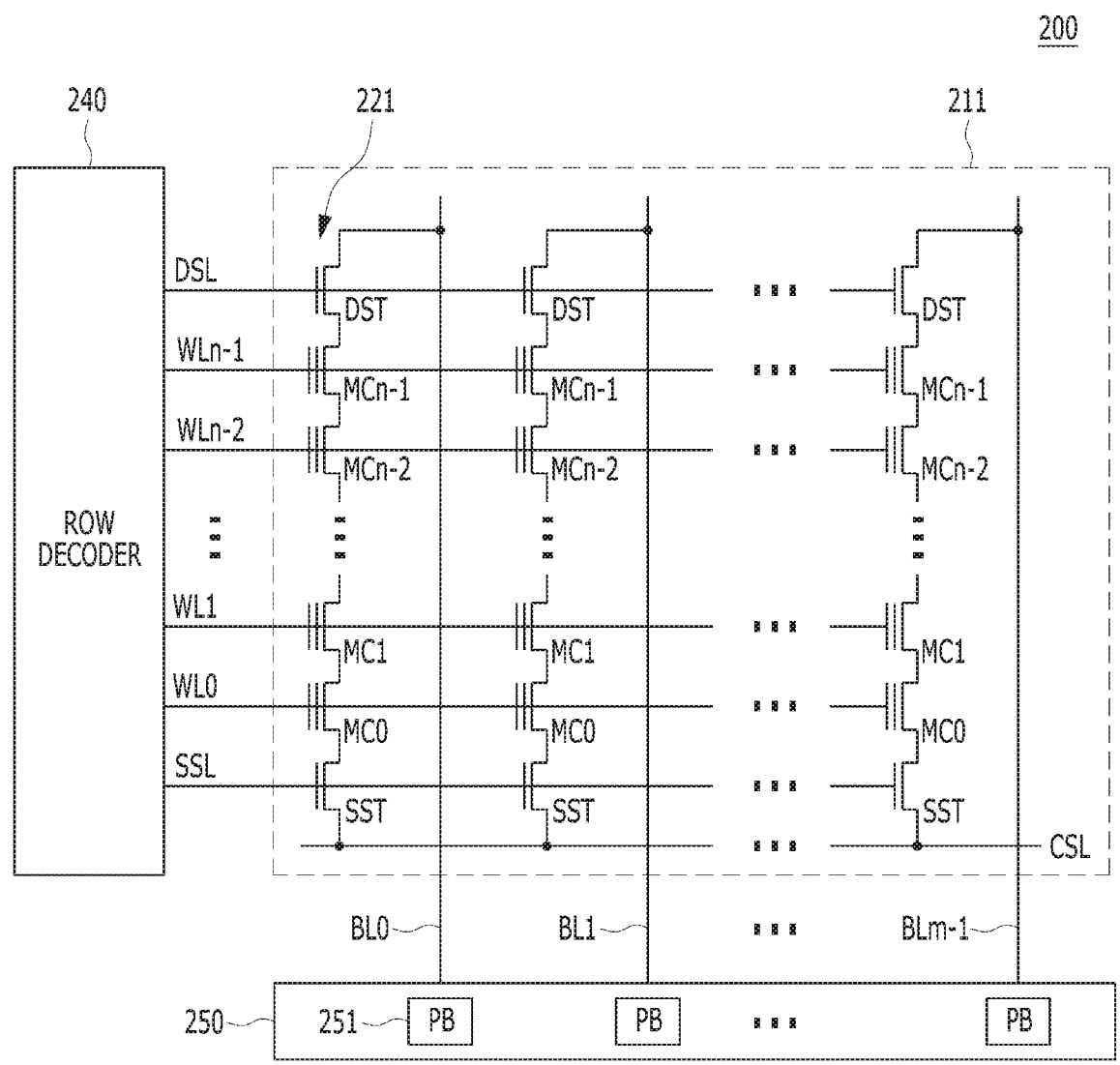
FIG. 3 is a circuit diagram illustrating a memory block of a memory device of a memory system in accordance with an embodiment of the present invention.

The page buffer 250 may be in electrical communication with the memory cell array 210 through bit lines BL (shown in FIG. 3). The page buffer 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit/receive data to/from the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn-1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm-1. The page buffers 251 may operate in response to page buffer control signals. For example, the page buffers 251 my temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
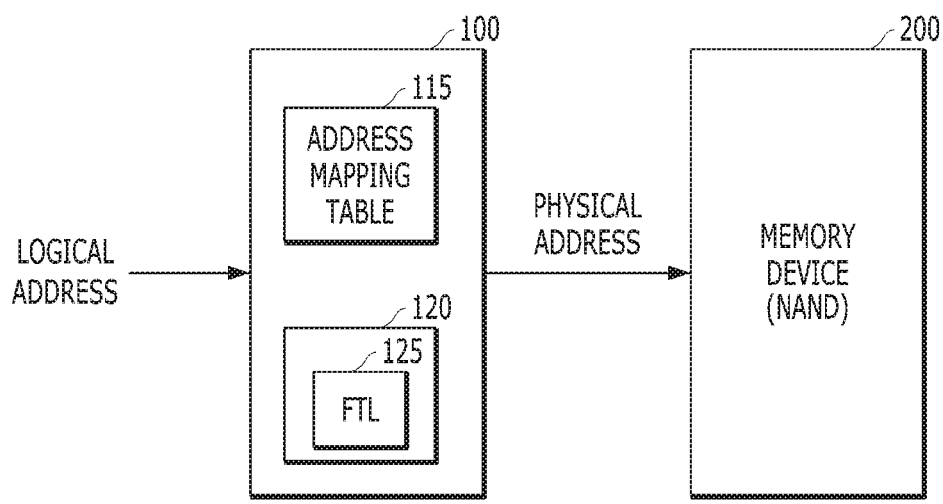
FIG. 4 is a diagram illustrating a memory system for address translation in accordance with an embodiment of the present invention.

FIG. 4 is a diagram illustrating a memory system for address translation in accordance with an embodiment of the present invention.

Referring to FIG. 4, the memory system may include a controller 100 and a memory device 200. The controller 100 may include an address mapping table 115 and a control component 120.

The control component 120 may drive firmware, which is referred to as a flash translation layer (FTL) 125, to control general operations of the memory system 10. In various embodiments, the FTL 125 may perform operations such as logical-to-physical (L2P) mapping, wear leveling, garbage collection, and/or bad block handling. Specifically, the FTL 125 may receive a logical address from a host device of FIG. 1, perform the L2P mapping operation (i.e., logical block addressing (LBA) or logical block mapping) with reference to the address mapping table 115 and output a physical address corresponding to the logical address. The physical address may be provided to the memory device 200.

The memory device 200 may be implemented with flash memory device(s), particularly of the NAND-type.

As described above, a memory system such flash-based solid state drives (SSDs) may require the H L 125 to provide logical block mapping. This is required because the host device uses a logical block address (LBA) (or a logical address) to address different pages of the memory device 200, while the SSD uses a physical block address (PBA) (or a physical address) to address different physical pages in the memory device 200. The FTL 125 provides a mapping between LBA and corresponding PBA for commands (e.g., read and write commands) to be served efficiently.

For a large capacity SSD, the number of unique LBAs is large and using a page-level mapping scheme that stores PBA corresponding to each LBA for the entire drive requires a huge amount of meta-data to be stored. This meta-data in turn requires prohibitively large storage (e.g., a random access memory (RAM) included in the storage of FIG. 2) to provide sufficient read and write performance. A block-level mapping scheme stores a group of pages with consecutive LBA in the same physical block. This requires significantly less storage, however, it causes significant endurance issues under a random write workload.

Thus, there is a need for a mapping scheme that provides good performance with a low storage requirement.

Embodiments of the invention provide a scheme to map logical block address to physical block address in a memory device like flash-based solid state drives. The mapping scheme has lower memory requirements than a page-level mapping scheme. In various embodiments, physical blocks of a memory device may be divided into two groups. One group of the physical blocks may use a block-level mapping, which has a capacity equal to the logical capacity of the memory device. The other group of the physical blocks may use a page-level mapping, which has a capacity equal to the over-provisioning portion of the memory device. The page-level mapping may be implemented with a hash table which keeps the memory requirements low. Furthermore, the hash table may be reduced in size by storing a second hash of the key in memory. A bit-map may be stored in a memory to indicate the part of the memory device where any given LBA is stored.

In other words, all physical blocks in a memory device (e.g., SSD) may be divided dynamically into two groups, one group being data blocks and the other log blocks. A hybrid-mapping scheme may be used for mapping any LBA to its corresponding PBA. Specifically, data blocks of the memory device have a capacity equal to the logical capacity of the memory device and use a block-level mapping scheme. The log blocks may consist of the over-provisioning portion of the memory device and use a page-level mapping scheme. Writes from a host device are written in the log blocks first, and pages of the log blocks are aggregated and written to data blocks in background operations. In various embodiments, the page-level mapping for the log blocks may be stored in a hash table with open addressing and robin-hood probing. This hash table uses much smaller RAM space, and provides good read and write performance with random workloads.

Figure 5:
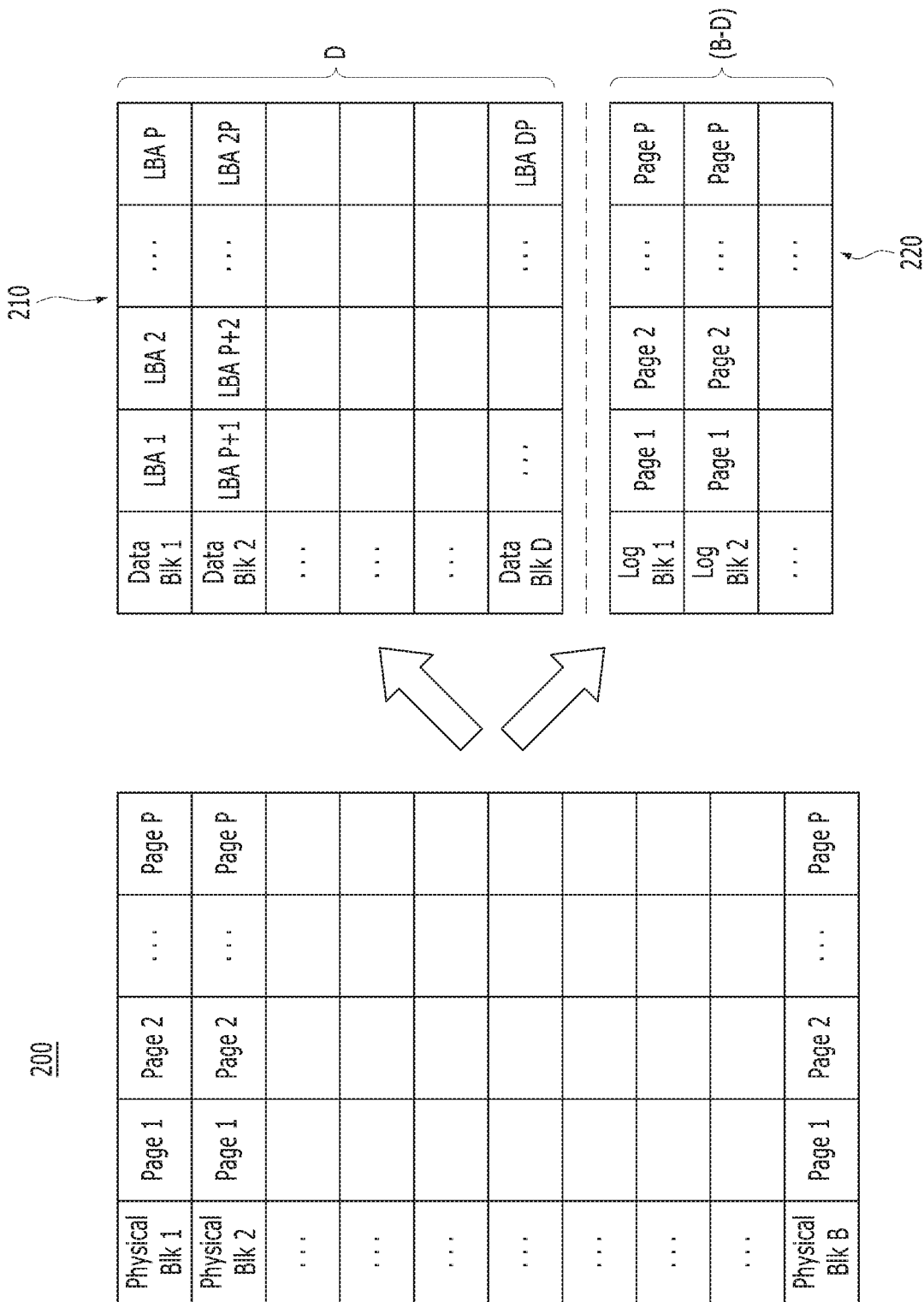
FIG. 5 is a diagram illustrating a memory device in accordance with an embodiment of the present invention.

FIG. 5 is a diagram illustrating a memory device in accordance with an embodiment of the present invention, for example, the memory device 200 of FIG. 4.

Referring to FIG. 5, the memory device 200 may include a plurality of physical blocks Physical Blk1 to Physical Blk B. Each of the physical blocks may include a plurality of pages Page 1 to Page P. The physical blocks may be divided dynamically into a first group or portion 210 and a second group or portion 220. The first portion 210 (or data blocks 210) may include a plurality of data blocks Data Blk 1 to Data Blk D. The second portion 220 (or log blocks 220) may include a plurality of log blocks including Log Blk 1 and Log Blk 2. The total number of physical blocks may be B and the number of pages inside a block may be P. The B physical blocks may be partitioned into two groups of D data blocks 210 and (B−D) log blocks 220.

As shown in FIG. 5, the logical capacity of the memory device 200 is (D×P) logical pages. For example, the first data block Data Blk 1 stores pages with LBA between 1 and P. The second data block Data Blk 2 stores pages with LBA between (P+1) and (2×P). The last data block Data Blk D stores a page corresponding to LBA (D×P) in the last physical page. A block-level mapping scheme may be used to determine the PBA in the data blocks 210 corresponding to any LBA.

The log blocks 220 may store pages corresponding to any LBA. A page-level mapping scheme may be used for storing the LBA to PBA mapping for all pages in the log blocks. For the page-level mapping scheme, a hash table may be used.

Figure 6:
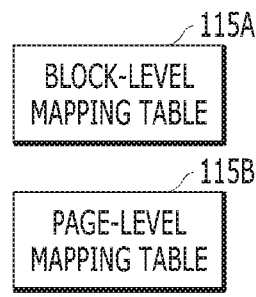
FIG. 6 is a diagram illustrating an address mapping table in accordance with an embodiment of the present invention.

FIG. 6 is a diagram illustrating an address mapping table in accordance with an embodiment of the present invention, for example, the address mapping table 115 of FIG. 4.

Referring to FIG. 6, the address mapping table 115 may include a block-level mapping table 115A and a page-level mapping table 115B. The block-level mapping table 115A may be used for the data blocks 210 of FIG. 5. The page-level mapping table 115B may be used for the log blocks 220 of FIG. 5. The page-level mapping table 115B may be implemented with a hash table. Although FIG. 6 illustrates the address mapping table 115 including two mapping tables, the address mapping table 115 may be implemented with any appropriate number of mapping tables, for example, a single mapping table.

Referring again to FIG. 4, the FTL 125 may store the address mapping table 115 as mapping tables that convert data and/or log block index to physical block index, and physical block index to data and/or log block index. The user data corresponding to any LBA may be stored either in the data blocks 210 or the log blocks 220 of FIG. 5 at a given time. The FTL 125 may manage a bit-map called a dirty bit-map including a plurality of bits. Through the bit-map, the lth bit denotes whether user data may be found in the data blocks 210 or the log blocks 220.

Figure 7:
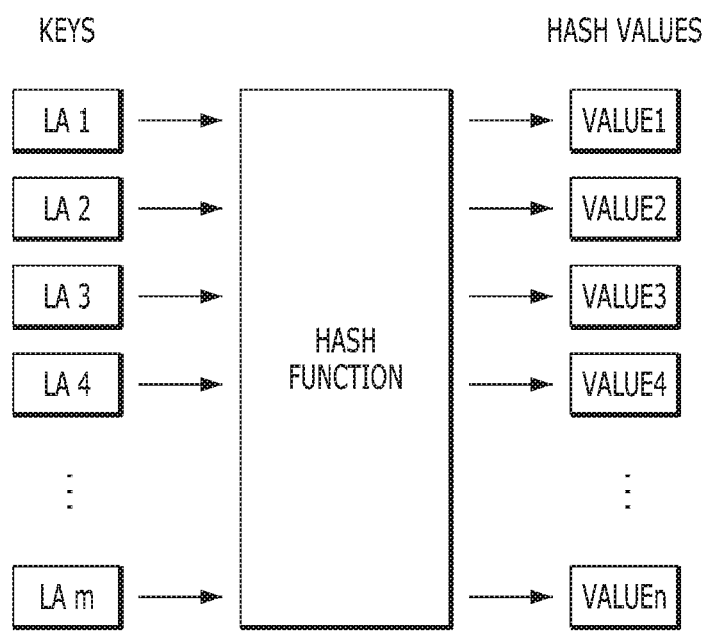
FIG. 7 is a diagram illustrating a flash translation layer in accordance with an embodiment of the present invention.

FIG. 7 is a diagram illustrating a flash translation layer in accordance with an embodiment of the present invention, for example, the FTL 125 of FIG. 4.

Referring to FIG. 7, the FTL 125 may maintain the page-level mapping of all pages stored in the log blocks 220 of FIG. 5 using a hash table. For implementation of the hash table, the FTL 125 may perform a hash function. Through the hash function, the FTL 125 may generate hash values VALUE1 to VALUEn. In other words, the FTL 125 may receive any one of logical addresses (e.g., LA1 to LAm) as a key of the hash function, and perform the hash function based on the received key to generate a hash value.

In various embodiments, for workloads with sequential reads, the hash function may be as simple as the least significant bits of the LBA l, which increases the cache-hit rate during lookups in the hash table. Other hash functions may be designed that allow the FTL 125 to take advantage of any cache layer in the control component 120 of FIG. 2 (e.g., a processor). The computation of the hash function may be done in separate hardware module rather than firmware to reduce command processing latency and power consumption of the controller 100 of FIGS. 2 and 4.

FIG. 8 is a diagram illustrating a page-level mapping table in accordance with an embodiment of the present invention, for example, the page-level mapping table 115B of FIG. 6.

Referring to FIG. 8, the page-level mapping table 115B may be a hash table. The hash table may be implemented with a random access memory (RAM). A common implementation of hash table uses buckets of linked-lists. However, each entry in the linked-list requires storing a pointer to resolve collisions. The memory required to store these pointers is increased (e.g., up to 33% increase) in memory requirements to store the keys and values. Therefore, implementing the hash table with buckets of linked-lists may cause significant increase in the memory requirements.

In various embodiments, the hash table may include an array of elements and respective indexes. The indexes may correspond to respective hash values of the hash function, as shown in FIG. 7. Each of the elements may store a key and a value of an entry. The key and value of any entry may be the LBA, denoted as l, and the corresponding PBA inside the log blocks 220 of FIG. 5, denoted as p(l), respectively.

Given any element (Key=l, Value=p(l)), the index at which it is stored is determined by the hash function of its key and is denoted as h(l). Since the hash function may map multiple LBAs (or LAs) to the same index, the index h(l) may already be associated with an element (Key=l', Value=p (l')). In other words, there may be a hash collision. For resolving the hash collision, the open addressing hash table with linear probing may be used. In accordance with the open addressing scheme with linear probing, instead of using the index h(l) to access the elements of the array, the array may be accessed sequentially, starting at index h(l)+1 until an empty slot is found. Alternatively, a Robin hood probing scheme may be used to limit the number of probes in the worst-case by swapping entries with lower probe count in order to insert elements that have a higher probe count.

The maximum number of entries that need to be stored in the hash table may be equal to the number of pages in the log blocks 220 of FIG. 5, i.e., (B−D)×P. Therefore, the size of the hash table is upper bounded and does not need to grow dynamically at run-time. The hash table may be implemented as an array of the size (B−D)×P×O. O denotes the overhead and may be chosen to be between 1 and 2 depending on the memory (e.g., RAM) available and the distribution of probes required to lookup/insert any entry in the hash table. A higher value of O allows the number of probes to be lower, but increases the memory requirement for the hash table.

In various embodiments, the memory (i.e., RAM) requirement may be further reduced. The further reduction of the memory requirement may be achieved by noting that the key (i.e., the LBA l) is not required to be stored in the hash table (i.e., RAM). Instead, it can be read from meta-data of a page in a memory device (e.g., NAND page), where it is already stored for assisting rebuild of a logical-to-physical (L2P) table between a logical address and a physical address. Since the size of the key is roughly equal to the size of the value, this represents a significant reduction over the RAM requirements of the hash-table. However, in this scheme, any collision in the hash table cannot be resolved without a NAND read. Therefore, a second hash of the LBA which is smaller in size may be stored in the hash table so that the probability of reading multiple NAND pages to recover a single user page is lower than any requirement, but the hash table is still much smaller in size. The hash table of this scheme may be called a partial hash table.

Figure 9:
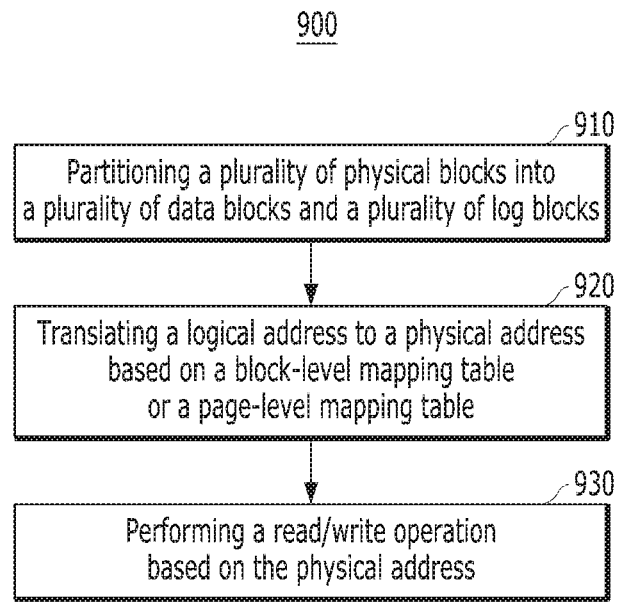
FIG. 9 is a flow chart illustrating an operation of a memory system in accordance with an embodiment of the present invention.

FIG. 9 is a flow chart illustrating an operation of a memory system in accordance with an embodiment of the present invention. For example, the operation of FIG. 9 may be performed by the controller 100 of the memory system in FIG. 4 (i.e., the FTL 125 of the control component 120 in FIG. 4).

Referring to FIG. 9, at step 910, the controller 100 may partition a plurality of physical blocks included in the memory device 200 into a plurality of data blocks and a plurality of log blocks. In various embodiments, the plurality of data blocks may be determined based on a logical capacity of the memory device 200, and the plurality of log blocks may be determined based on an over-provisioning portion of the memory device 200. Further, the controller 100 may generate a bit-map including a plurality of bits corresponding to a plurality of logical addresses. Each bit may indicate whether the corresponding logical address belongs to the data blocks or the log blocks.

At step 920, the controller 100 may translate a logical address to a physical address based on a block-level mapping scheme or a page-level mapping scheme using the hash table 115 including the block-level mapping table 115A and the page-level mapping table 115B, as shown in FIG. 6.

At step 930, the controller 100 may perform a read and/or write operation based on the translated physical address. In other words, the controller 100 may control the memory device 200 to perform a read and/or write operation on a page of the memory device 200 corresponding to the translated physical address.

Although it is not illustrated in FIG. 9, the controller 100 may perform operations other than read and write operations, for example, an erase operation and a background operation such as a garbage collection.

Referring again to FIG. 4, a memory system such as flash-based solid state drives (SSDs) requires a flash translation layer (FTL) 125 of a controller 100 to provide a mapping between logical addresses used by a host and physical addresses of all physical pages included in a memory device 200 (e.g., NAND). To ensure that the mapping table 115 for the FTL 125 requires small memory, a hybrid mapping may be used where two different parts of the memory device 200 use two different levels of granularities in address translation. Specifically, as shown in FIGS. 5 and 6, data blocks 210 use block-level address translation while log blocks 220 use page-level address translation. However, this scheme suffers from a high write amplification (WA) that severely reduces the endurance of the memory system. The write amplification represents the ratio of NAND writes (i.e., data written to the memory device) to host writes (i.e., data written by the host). A large value of WA significantly reduces the lifetime of the memory system. Thus, it is required to provide a garbage collection scheme to reduce WA of the memory system such as flash-based solid state drives (SSDs) using hybrid mapping. Embodiments of the present disclosure provide a scheme for performing garbage collection for memory system with hybrid mapping.

When a hybrid mapping is used in the FTL 125, as shown in FIG. 5, data blocks 210 may store pages in sequential order of their LBAs (or logical addresses). The pages in log blocks 220 may not be in any specific order with regards to their LBA. A block-level mapping provides address translation for pages stored in the data blocks 210, and a page-level mapping provides address translation for pages stored in the log blocks 220. For these address translations, mapping tables 115A and 115B may be stored in the storage 110. Further, a data structure such as a bit-map is also stored in the storage 110 to determine if the page corresponding to any given LBA is currently stored in the data blocks 210 or the log blocks 220. When a page is stored in one of the log blocks 220, its LBA may be referred to as dirty. In other words, data for logical addresses corresponding to dirty pages are stored in the log blocks 220.

Figure 10:
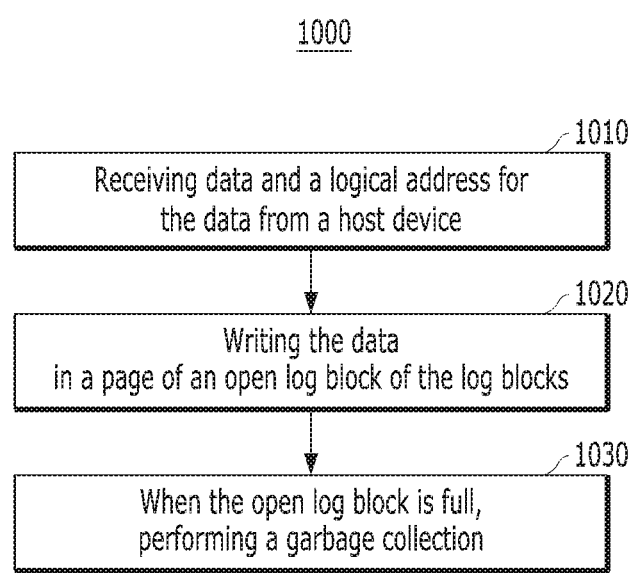
FIG. 10 is a flow chart schematically illustrating a garbage collection operation of a memory system in accordance with an embodiment of the present invention.

FIG. 10 is a flow chart schematically illustrating a garbage collection operation 1000 of a memory system in accordance with an embodiment of the present invention. For example, the operation of FIG. 10 may be performed by the controller 100 of the memory system in FIG. 4 (i.e., the FTL 125 of the control component 120 in FIG. 4).

Referring to FIG. 10, at step 1010, the controller 100 may receive data and a logical address for the data from a host device. At step 1020, the controller 100 may write the data in a page of an open log block of the log blocks 220 of FIG. 5. The log blocks 220 may be kept open at all times and writes from the host device may be performed in the log blocks 220. When the open log block is programmed completely, a garbage collection process may be started. In other words, when the open log block is full, at step 1020, the controller 100 may perform a garbage collection. In various embodiments, the garbage collection may be performed in accordance with the flows in FIGS. 11 and 12.

FIG. 11 is a flow chart illustrating a garbage collection operation 1100 of a memory system in accordance with an embodiment of the present invention. For example, the operation 1100 of FIG. 11 may be performed by the controller 100 of the memory system in FIG. 4 (i.e., the FTL 125 of the control component 120 in FIG. 4).

Referring to FIG. 11, at step 1110, the controller 100 may receive data and a logical address for the data from a host device. At step 1120, the controller 100 may write the data in a page of an open log block among the plurality of log blocks 220 of FIG. 5. At step 1130, when the open log block is full, the controller 100 may select a data block with the largest number of dirty pages among the plurality of data blocks, and select a log block with the largest number of invalid pages among the plurality of log blocks. The invalid pages may include pages of which data are copied from the corresponding log block to data blocks corresponding to the logical addresses of the copied data. Valid pages may include pages of which data are not copied from the corresponding log block to the data blocks 210. Data for logical addresses corresponding to dirty pages may be stored in any open log block that is not full, among the plurality of log blocks 220.

At step 1140, the controller 100 may perform a garbage collection on the selected data block and the selected log block.

The controller 100 may perform an operation of the garbage collection for data block as follows.

The controller 100 may select the data block with the largest number of dirty pages as a victim block, among the data blocks 210 of FIG. 5. When the data block is v, the data block v may store LBAs between (v×P+1) and (v+1)×P. For LBAs l in this range, the data from the corresponding physical address may be copied into an empty block. In particular, first, data corresponding to the LBAs of the data block v may be stored in the data block v or in the certain log block. The certain log block may be found in the hash table 115B of FIG. 8 by a lookup with key l. The LBAs that are marked as "False" in the bit-map may be copied from the data block v. The LBAs that are marked as "True" in the bit-map may be copied from the physical address p(l) of the certain log block. Second, the LBAs of the certain log block may be marked as "False" in the bit-map, and the corresponding element in the hash table 115B may be deleted. Third, the invalid page count value of the log block corresponding to the physical address p(l) may be incremented by one. Fourth, after all LBAs are copied, the data to physical block index mapping may be updated for the data block v. Finally, the data block v as the victim block may be erased and added to the pool of empty blocks.

The controller 100 may perform an operation of the garbage collection for log block as follows.

First, the controller 100 may select the log block with the largest number of invalid pages as a victim block, among the log blocks 220 of FIG. 5. Second, when the victim block is v, the valid pages in the log block v are copied to an empty block. Third, the corresponding elements in the hash table 115B of FIG. 8 may be updated by their new physical address. Finally, the victim block v may be erased and added to the pool of the empty blocks. Accordingly, a single data block and a single log block may be refreshed in each garbage collection process.

FIG. 12 is a flow chart illustrating a garbage collection operation 1200 of a memory system in accordance with an embodiment of the present invention. For example, the operation 1200 of FIG. 12 may be performed by the controller 100 of the memory system in FIG. 4 (i.e., the FTL 125 of the control component 120 in FIG. 4).

Referring to FIG. 12, at step 1210, the controller 100 may receive data and a logical address for the data from a host device. At step 1220, the controller 100 may write the data in a page of an open log block among the plurality of log blocks 220 of FIG. 5. At step 1230, when the open log block is full, the controller 100 may identify a log block among the plurality of log blocks, and a data block among the plurality of data blocks.

At step 1240, the controller 100 may select one block as a victim block, among the identified log block and the identified data block, based on the number of dirty pages in the identified data block and the number of invalid pages in the identified log block.

In various embodiments, the controller 100 may determine the ratio R of the number of dirty pages in the identified data block to the number of invalid pages in the identified log block, and compare the ratio R with a threshold value F. When the ratio R is greater than the threshold value F, the controller 100 may select the identified data block as a victim block. In other words, if the ratio R is greater than the threshold value F, one data block refresh operation may be performed and the ratio R may be computed again. These steps are repeated till the ratio R is less than threshold value F.

When the ratio R is less than or equal to the threshold value F, the controller 100 may select the identified log block as a victim block. The optimal value of the threshold value F may be determined using offline simulations.

At step 1250, the controller 100 may perform a garbage collection operation on the selected block as the victim block. The victim block may be refreshed through a garbage collection operation. The operation is different for the data blocks and the log blocks.

To refresh a data block v, first, the data block v with the largest number of dirty pages may be selected as the victim block and an empty block may be selected as the target block. The pages corresponding to the data block v may have LBAs including L, L+1, L+2, . . . , L+P−1, where P is the number of pages in a block. Second, the pages corresponding to these LBAs may be copied sequentially from certain log blocks or the victim block v, depending on whether the corresponding LBA is dirty or not, into the target block. The LBAs that are marked as "False" in the bit-map may be copied from the data block v. The LBAs that are marked as "True" in the bit-map may be copied from the physical address p(l) of the certain log blocks. Third, pages copied from the log blocks are marked as invalid pages in the corresponding log block. Fourth, once all pages are copied, a logical pointer to the victim block may be updated to point to the target block. Finally, the victim block may be erased and added to the pool of empty blocks.

To refresh a log block, first, the log block with the largest number of invalid pages may be selected as the victim block and an empty block may be selected as the target block. Second, the valid pages may be copied from the victim block into the target block. Further, the address translation data structures for the log blocks may be modified accordingly. Finally, the victim block may be erased and added to the pool of empty blocks. The remaining space in the target block may be used for future write requests for the host device.

FIG. 13 is a flow chart illustrating a garbage collection operation 1300 of a memory system in accordance with an embodiment of the present invention. For example, the operation 1300 of FIG. 13 may be performed by the controller 100 of the memory system in FIG. 4 (i.e., the FTL 125 of the control component 120 in FIG. 4).

Referring to FIG. 13, at step 1310, the controller 100 may receive data and a logical address for the data from a host device. At step 1320, the controller 100 may write the data in a page of an open log block among the plurality of log blocks 220 of FIG. 5.

At step 1330, the controller 100 may determine whether the open log block is full. When it is determined that the open log block is not full (NO at step 1330), the controller 100 may end the operation 1300.

When it is determined that the open log block is full (YES at step 1330), at step 1340, the controller 100 may identify a log block among the plurality of log blocks, and a data block among the plurality of data blocks. Further, the controller 100 may determine the ratio R of the number of dirty pages in the identified data block to the number of invalid pages in the identified log block. At step 1350, the controller 100 may compare the ratio R with a threshold value F. The optimal value of the threshold value F may be determined using offline simulations.

When it is compared that the ratio R is greater than the threshold value F (YES at step 1350), at step 1360, the controller 100 may select the identified data block as a victim block. Further, the controller 100 may perform a garbage collection on the selected data block as the victim block. Then, the controller 100 may proceed to step 1340. In other words, if the ratio R is greater than the threshold value F, one data block refresh operation may be performed and the ratio R may be computed again. These steps are repeated till the ratio R is less than threshold value F.

When it is compared that the ratio R is less than or equal to the threshold value F (NO at step 1350), at step 1370, the controller 100 may select the identified log block as a victim block. Further, the controller 100 may perform a garbage collection on the selected log block as the victim block. Then, the controller 100 may end the operation 1300.

As described above, in accordance with the garbage collection scheme of FIGS. 12 and 13, multiple data blocks (i.e., zero or more data blocks) may be refreshed and then a single log block may be refreshed. The number of data blocks that are refreshed may be adaptive and may depend on the maximum number of dirty pages in any data block, the maximum number of invalid pages in any log block and a threshold value F.

The following TABLE 1 shows write amplification (WA) for garbage collection (GC) schemes for various overprovisioning of solid state drive as the memory system in accordance with the embodiments. GC scheme 1 corresponds to embodiments of FIG. 11, and GC scheme 2 corresponds to embodiments of FIG. 12. It is assumed that random 4 KiB write requests on a 16 GiB drive with page size 4 KiB and P=4096 pages per block. The optimal values of the threshold F are determined numerically using grid search in offline simulations. Last column indicates improvements of GC scheme 2 with respect to GC scheme 1.

TABLE 1

|  | Write Amplification | | Improvement |
| --- | --- | --- | --- |
| Overprovisioning | GC scheme 1 | GC scheme 2 | (GC2 vs. GC1) |
| 3.5% | 29.51 | 20.24 with F = 5.0 | 31.4% |
| 7% | 14.78 | 11.26 with F = 4.0 | 23.8% |
| 14% | 7.59 | 6.52 with F = 2.5 | 14.1% |
| 21% | 5.25 | 4.82 with F = 2.0 | 8.2% |
| 28% | 4.14 | 3.97 with F = 1.5 | 4.1% |
| 35% | 3.46 | 3.45 with F = 1.0 | 0.3% |

As the foregoing describes, embodiments of the present invention provide garbage collection schemes for hybrid address mapping. While embodiments show that garbage collection operations for data blocks are performed and then garbage collection operations for log blocks are performed, the present invention includes other embodiments of determining when and in what order garbage collection should be performed. Also, the present invention extends to embodiments in which the data blocks use address translation at levels other than block-level.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims.

What is claimed is:

1. A method for operating a memory system including a memory device, which includes a plurality of physical blocks, the method comprising:
    partitioning the plurality of physical blocks into a plurality of data blocks and a plurality of log blocks, each of the data blocks including a plurality of pages corresponding to logical addresses and each of the log blocks including multiple pages;
    receiving data and a logical address for the data from a host device;
    writing the data in a page of an open log block among the plurality of log blocks;
    when the open log block is full,
        selecting a data block with the largest number of dirty pages among the plurality of data blocks, and selecting a log block with the largest number of invalid pages among the plurality of log blocks; and
        performing a garbage collection on the selected data block and the selected log block,
    wherein data for logical addresses corresponding to the dirty pages are stored in any open log block that is not full, and data of invalid pages are copied from the corresponding log block to data blocks corresponding to the logical addresses of the copied data.

2. The method of claim 1, wherein the performing of the garbage collection comprises performing the garbage collection on the selected data block including:
    determining whether data corresponding to logical addresses allocated to the selected data block are stored in the selected data block or in the log blocks; and
    copying the data corresponding to the logical addresses from the selected data block or the log blocks into an empty block.

3. The method of claim 2, further comprising:
    erasing the selected data block as a victim block.

4. The method of claim 1, wherein the performing of the garbage collection comprises performing the garbage collection on the identified log block, which is the selected block, including:
    copying data of valid pages in the selected log block into an empty block; and
    erasing the selected log block as a victim block.

5. A method for operating a memory system including a memory device, which includes a plurality of physical blocks, the method comprising:
    partitioning the plurality of physical blocks into a plurality of data blocks and a plurality of log blocks, each of the data blocks and each of the log blocks including a plurality of pages;
    receiving data and a logical address for the data from a host device;
    writing the data in an open log block among the plurality of log blocks;
    when the open log block is full,
        identifying a log block among the plurality of log blocks and a data block among the plurality of data blocks;
        selecting one block among the identified log block and the identified data block based on the number of dirty pages in the identified data block and the number of invalid pages in the identified log block; and
        performing a garbage collection on the selected block,
    wherein data for logical addresses corresponding to the dirty pages are stored in any open log block that is not full, and data of invalid pages are copied from the corresponding log block to data blocks corresponding to the logical addresses of the copied data.

6. The method of claim 5, wherein the performing of the garbage collection comprises performing the garbage collection on the identified data block, which is the selected block, including:

determining whether data corresponding to logical addresses allocated to the selected data block are stored in the selected data block or in the log blocks; and copying the data corresponding to the logical addresses from the selected data block or the log blocks into an empty block.

7. The method of claim 6, further comprising:
erasing the selected data block as a victim block.

8. The method of claim 5, wherein the performing of the garbage collection comprises performing the garbage collection on the identified log block, which is the selected block, including:
copying data of valid pages in the selected log block into an empty block; and
erasing the selected log block as a victim block.

9. The method of claim 5, wherein the selecting of the one block comprises selecting the one block among the identified log block and the identified data block based on the ratio of the number of dirty pages in the identified data block to the number of invalid pages in the identified log block.

10. The method of claim 9, wherein the selecting of the one block comprises:
determining the ratio of the number of dirty pages in the identified data block to the number of invalid pages in the identified log block;
comparing the ratio with a threshold value;
when the ratio is greater than the threshold value, selecting the identified data block; and
when the ratio is less than or equal to the threshold value, selecting the identified log block,
wherein the ratio is iteratively determined until the log block is selected.

11. A memory system comprising:
a memory device including a plurality of physical blocks; and
a controller suitable for:
partitioning the plurality of physical blocks into a plurality of data blocks and a plurality of log blocks, each of the data blocks including a plurality of pages corresponding to logical addresses and each of the log blocks including multiple pages;
receiving data and a logical address for the data from a host device;
writing the data in a page of an open log block among the plurality of log blocks;
when the open log block is full,
selecting a data block with the largest number of dirty pages among the plurality of data blocks, and selecting a log block with the largest number of invalid pages among the plurality of log blocks; and
performing a garbage collection on the selected data block and the selected log block,
wherein data for logical addresses corresponding to the dirty pages are stored in any open log block that is not full, and data of invalid pages are copied from the corresponding log block to data blocks corresponding to the logical addresses of the copied data.

12. The memory system of claim 11, wherein the controller performs the garbage collection on the identified data block, which is the selected block, by:
determining whether data corresponding to logical addresses allocated to the selected data block are stored in the selected data block or in the log blocks; and
copying the data corresponding to the logical addresses from the selected data block or the log blocks into an empty block.

13. The memory system of claim 12, wherein the controller erases the selected data block as a victim block.

14. The memory system of claim 11, wherein the controller performs the garbage collection on the identified log block, which is the selected block, by:
copying data of valid pages in the selected log block into an empty block; and
erasing the selected log block as a victim block.

15. A memory system comprising:
a memory device including a plurality of physical blocks; and
a controller suitable for:
partitioning the plurality of physical blocks into a plurality of data blocks and a plurality of log blocks, each of the data blocks and each of the log blocks including a plurality of pages;
receiving data and a logical address for the data from a host device;
writing the data in an open log block among the plurality of log blocks;
when the open log block is full,
identifying a log block among the plurality of log blocks and a data block among the plurality of data blocks;
selecting one block among the identified log block and the identified data block based on the number of dirty pages in the identified data block and the number of invalid pages in the identified log block; and
performing a garbage collection on the selected block,
wherein data for logical addresses corresponding to the dirty pages are stored in any open log block that is not full, and data of the invalid pages are copied from the corresponding log block to data blocks corresponding to the logical addresses of the copied data.

16. The memory system of claim 15, wherein the controller performs the garbage collection on the identified data block, which is the selected block, by:
determining whether data corresponding to logical addresses allocated to the selected data block are stored in the selected data block or in the log blocks; and
copying the data corresponding to the logical addresses from the selected data block or the log blocks into an empty block.

17. The memory system of claim 16, wherein the controller erases the selected data block as a victim block.

18. The memory system of claim 15, wherein the controller performs the garbage collection on the identified log block, which is the selected block, including:
copying data of valid pages in the selected log block into an empty block; and
erasing the selected log block as a victim block.

19. The memory system of claim 15, wherein the controller selects the one block among the identified log block and the identified data block based on the ratio of the number of dirty pages in the identified data block to the number of invalid pages in the identified log block.

20. The memory system of claim 19, wherein the controller:
determines the ratio of the number of dirty pages in the identified data block to the number of invalid pages in the identified log block;
compares the ratio with a threshold value;
when the ratio is greater than the threshold value, selects the identified data block; and
when the ratio is less than or equal to the threshold value, selects the identified log block, wherein the ratio is iteratively determined until the log block is selected.

* * * * *